(12) United States Patent
Mackel et al.

(10) Patent No.: US 6,969,343 B2
(45) Date of Patent: Nov. 29, 2005

(54) CENTRIFUGE WITH A SIEVE SYSTEM AND METHOD FOR OPERATING THE SAME

(75) Inventors: Wilfried Mackel, Oelde (DE); Jochen Hamatschek, Oelde (DE)

(73) Assignee: Westfalia Separator Food Tec GmbH, Oelde (DE)

( * ) Notice: Subject to any disclaimer, the term of this patent is extended or adjusted under 35 U.S.C. 154(b) by 73 days.

(21) Appl. No.: 10/297,436

(22) PCT Filed: May 30, 2001

(86) PCT No.: PCT/EP01/05332

§ 371 (c)(1),
(2), (4) Date: Dec. 6, 2002

(87) PCT Pub. No.: WO01/94024

PCT Pub. Date: Dec. 12, 2001

(65) Prior Publication Data

US 2003/0146146 A1    Aug. 7, 2003

(30) Foreign Application Priority Data

Jun. 8, 2000   (DE) ..................... 100 27 958

(51) Int. Cl.$^7$ ................................. B04B 7/16
(52) U.S. Cl. .................. 494/36; 494/40; 494/64; 494/68; 210/636; 210/382
(58) Field of Search ................ 494/36, 40, 64, 494/68–70; 210/636, 360.1, 380.1, 382, 379, 360.2, 321.68

(56) References Cited

U.S. PATENT DOCUMENTS

| | | | | |
|---|---|---|---|---|
| 955,890 A | * | 4/1910 | Marshall ............. | 494/36 |
| 1,032,641 A | * | 7/1912 | Wright ............... | 494/36 |
| 1,269,067 A | * | 6/1918 | Enell ................. | 210/360.2 |
| 1,468,740 A | * | 9/1923 | Paul .................. | 494/36 |
| 2,178,547 A | * | 11/1939 | Bjornstjerna ......... | 494/29 |
| 3,079,069 A | * | 2/1963 | Thylefors ............ | 494/27 |
| 3,279,686 A | * | 10/1966 | Hubmann .............. | 494/36 |
| 3,669,879 A | * | 6/1972 | Berriman ............. | 210/652 |
| 3,777,972 A | * | 12/1973 | Kjellgren ............ | 494/48 |
| 3,997,447 A | * | 12/1976 | Breton et al. ........ | 210/360.2 |
| 4,533,344 A | * | 8/1985 | Gunnewig ............. | 494/36 |
| 4,695,270 A | * | 9/1987 | Zettier .............. | 494/34 |
| 6,117,322 A | * | 9/2000 | Miller et al. ........ | 210/321.63 |

FOREIGN PATENT DOCUMENTS

| | | |
|---|---|---|
| DE | 1 209 063 | 4/1963 |
| DE | 2 214 487 | 10/1972 |
| DE | 26 35 460 A1 | 4/1977 |
| DE | 25 29 614 C2 | 8/1987 |
| JP | 60190249 A | 9/1985 |
| WO | WO 99 13960 | 3/1999 |

* cited by examiner

*Primary Examiner*—David Sorkin
(74) *Attorney, Agent, or Firm*—Barnes & Thornburg LLP

(57) ABSTRACT

A centrifuge, comprising a distributor for introducing material to be centrifuged and a sieve system having a plurality of axially mutually offset membrane plates, the membrane plates being arranged radially with respect to the distributor and having at least two axially-spaced membrane disks. The sieve system is arranged such that a flow directions of material to be centrifuged emerging from the distributor and a flow direction of particles deposited on the membrane plates are identical. Alos included is centrifugal drum having a centrifugal compartment with the sieve system arranged therein and a piston slide valve for closing the centrifugal drum. The invention is also a method for cleaning the centrifuge, the steps comprising: opening a piston slide valve, thereby allowing a return flow of liquid through the sieeve system; and removeing one or more of substances baked to the sieve system and impurities from the sieve system.

18 Claims, 2 Drawing Sheets

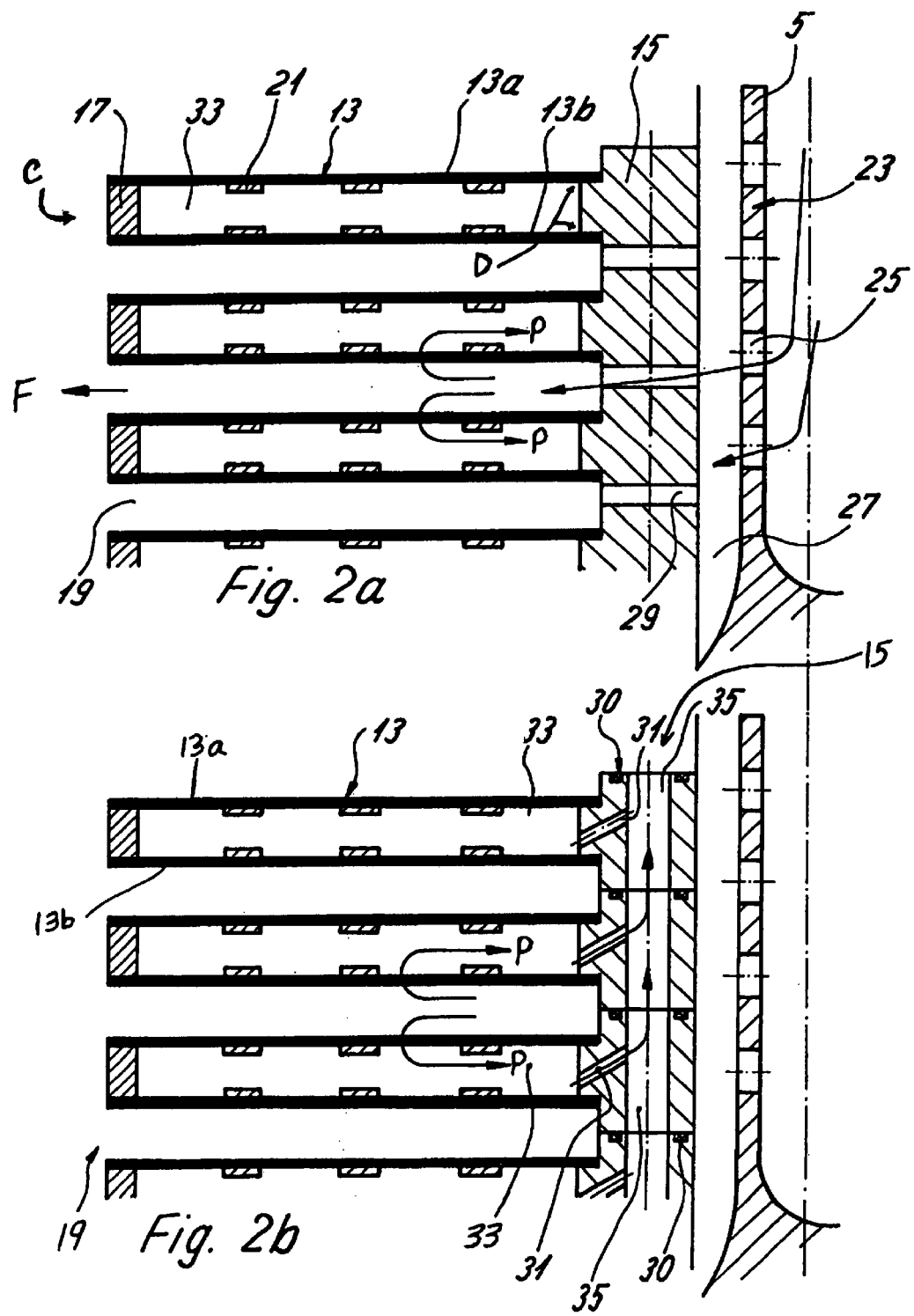

CENTRIFUGE WITH A SIEVE SYSTEM AND METHOD FOR OPERATING THE SAME

BACKGROUND AND SUMMARY OF THE INVENTION

The present invention relates to a centrifuge, particularly a separator. The present invention also relates to a method for operation of the centrifuge.

Centrifuges and methods for their operation are known, for example, from German Patent Document DE 25 29 614 C2. That document describes a device for the continuous rotary pressure filtration of liquid media. Filtration, in the sense of that document are sieve as well as membrane filtrations as well as micro- or ultrafiltrations. By means of a hydrostatic pressure difference, a concentrate current component is generated parallel to the surface of the filter, for the purpose of which a hydrodynamic delivery pressure is generated in the ring gap between the centrifuge drum and the coaxial drum-shaped filter element in that the drum and the filter element are simultaneously acted upon by mutually different rotary frequencies. Without the independent relative rotatability, allegedly an extremely surface-laminar cross-current component would be created between the filters which has only so little effect that the fractionation process would already cease shortly after the start of the filtration as a result of polarization effects and pore sealing.

The separate rotatability of the sieve drum causes high constructive expenditures and therefore considerably increases the cost of the centrifuge.

It should also be noted that in the reference above, despite the relative rotatability of the sieve drum with respect to the centrifugal drum, a rerinsing of the membrane by means of a rinsing liquid is often required. However, such a rerinsing requires high expenditures and interrupts the centrifuging operation for a considerable period of time.

The present invention further develops the initially described centrifuge such that a constructively simple sieve or sieve system is provided in which solids can easily flow out of the sieve area and the pore sealing is reduced. In addition, a desirable method of cleaning the centrifuge obtained.

The present invention is a centrifuge, comprising a distributor for introducing material to be centrifuged and a sieve system having a plurality of axially mutually offset membrane plates. The membrane plates are arranged radially with respect to the distributor and have at least two axially-spaced membrane disks. The disks are connected with each other by at least one plate spacing ring in an area of the disks' outer circumference. The sieve system is arranged such that a flow direction of the material to be centrifuged emerging from the distributor and a flow direction of particles deposited on the membrane plates are identical. Also included is a centrifugal drum having a centrifugal compartment with the sieve system arranged therein. The centrifuge also includes a piston slide valve for closing the centrifugal drum.

Thus, the sieve system of the present invention is designed and arranged such that the flow direction of the material to be centrifuged emerging from the distributor and the flow direction of particles deposited on the sieve elements of the sieve system is identical. This results in a disturbance-free transport. A separate rotatability of the sieve system relative to the drum, as is known in the art, is also no longer required.

For example, the sieve system of the present invention comprises at least one—but preferably several—sieve plate(s) which is/are arranged essentially radially with respect to a distributor and may be designed as a membrane plate or plates made of a ceramic material. The distributor may also be a feed tube, or there may be a separate feed tube. As a result of the flow direction of the centrifuged or charged material between the membrane plates toward the outside, the flow direction of the solids deposited on the membrane, whose transport takes place toward the outside because of the centrifugal effect, is identical.

A piston slide valve for opening and closing the centrifugal drum is preferably provided. A solids-enriched stage is drained from a solids space of the centrifugal drum by way of openings—preferably nozzles—in the outside diameter of the solids space and/or by way of ducts/bores toward the centrifugal drum head or feed end. Concerning such a draining by means of nozzles at the piston slide valve, reference is made to German Patent Document DE 22 14 487.

For the cleaning as well as for the draining, the solids space centrifuge compartment is opened up—particularly by opening the piston slide valve—so that solids deposited and/or disposed on the sieve and/or impurities (and possibly also cloggings, deposited substances) are drained through the opening(s) opened up by the piston slide valve.

This cleaning can be carried out without any additional use of rinsing liquid and a rinsing by means of a rinsing liquid is required only after a relatively long operation.

It should be stressed that, because of modern control techniques, it is possible to very precisely control the evacuation mechanism and in this manner also control the cleaning effects in the desired fashion. As a result, a long service life of the sieve system or membrane insert is achieved without the requirement of a production stop because of clogging. Because of the speed of the evacuating mechanism and the permitted regulating of the discharge volume, the intensity of the cleaning effect can be controlled as a function of the product being centrifuged.

In another embodiment of the present invention, the draining of the concentrate is conceivable by way of a separating plate or small tube, ducts and nozzles outside the sieve system or membrane insert. As a function of the product being centrifuged, this may result in a lengthening of the rerinsing intervals (evacuation intervals). An automating of the point at which evacuation occurs is also possible by monitoring the stage being drained.

As another alternative, the carrying-away of a partial flow of the concentrate by way of nozzles is conceivable.

Instead of a piston slide valve, an analog operating, discontinuously working opening mechanism may be used.

The membrane plates may be mounted in the centrifugal drum individually as well as as a preassembled unit. This naturally offers advantages during the mounting/demounting.

In particular, the present invention combines in a simple manner the technology of modern piston slide valve separators known per se with the idea of a membrane plate insert and thereby creates a type of "membrane separator".

The solids collection space preferably has a double-cone shape.

In particular, the invention provides a method of cleaning a centrifuge according to the present invention in the case of which, for cleaning the sieve system, preferably a piston slide valve of the centrifuge is opened up, so that a return flow of liquid through the sieve system removes substances deposited on or adhering to the sieve and/or impurities of the sieve.

Other aspects and novel features of the present invention will become apparent from the following detail description of the invention when considered in conjunction with the accompanying drawings.

BRIEF DESCRIPTION OF THE DRAWINGS

FIG. 2a is a cross-sectional view of an area of membrane plates of a sieve system, according to the present invention.

FIG. 2b is a cross-sectional view of an area of membrane plates of a sieve system angularly offset from the view of FIG. 1.

DETAILED DESCRIPTION OF THE PREFERRED EMBODIMENTS

Figure 1:
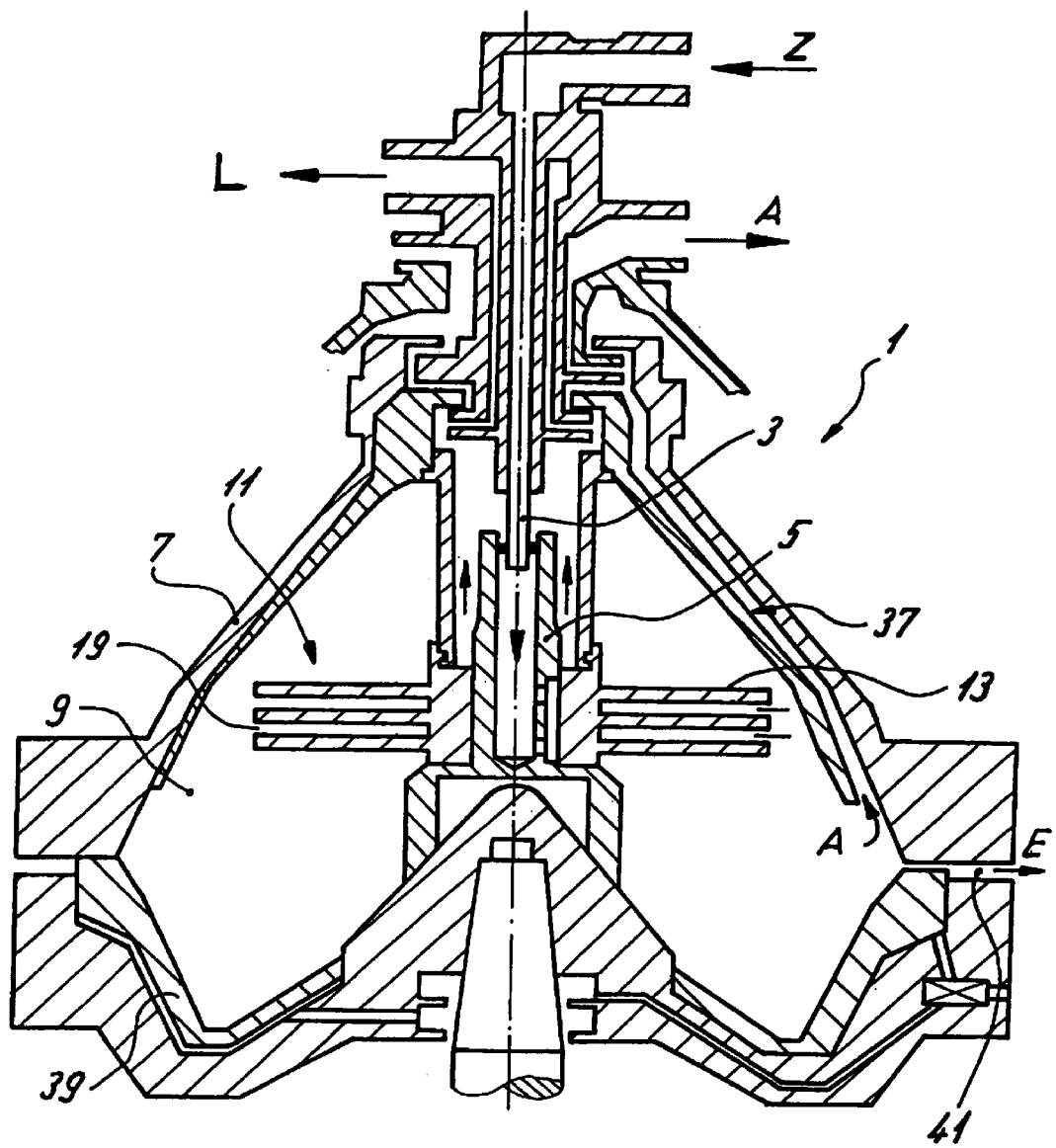
FIG. 1 is a sectional view of a centrifuge according to the present invention.

FIG. 1 shows a centrifuge or separator 1 with a feed tube 3 which leads into a distributor 5 used for the introduction of a material to be centrifuged into a centrifuge compartment 9 bounded by a centrifugal drum 7 and designed in the shape of a double cone. Centrifuge compartment 9 is provided with a sieve or sieve system 11—also called membrane insert—which may be made of a ceramic material or equivalent construction.

As shown in the embodiment of FIG. 1, the sieve arrangement 11 includes three sieve or membrane plates 13 spaced axially from one another and extending radially from the feed tube 3 and the distributor 5. FIGS. 2a and 2b show a plurality of membrane disks or plates 13, which are each arranged on distributor spacing rings 15 in an area of the inside diameter D of the plates 13, and which rings 15 surround the distributor 5. The membrane plates 13 may include two or more membrane disks 13a, 13b which are axially spaced away from one another and in an area of their outer circumference C, may be connected with one another by way of at least one plate spacing ring 17. Ring gaps 19 may be formed between the membrane plates 13. The membrane disks 13a, 13b may be stabilized on mutually facing sides of each membrane plate 13 by supporting rings 21.

Purely as an example, as shown in FIG. 1, three membrane plates 13 are provided in an embodiment of the present invention. However, FIGS. 2a and 2b show that a plurality of membrane plates may also be provided when the distributor 5 of the centrifuge 1 is designed correspondingly.

In its wall 23, the distributor 5 may have radially aligned bores 25 which lead into at least one duct 27. The at least one duct 27 extends vertically along the distributor 5 on its outer circumference and, in turn, by way of feed bores/ducts 29, leads between the distributor spacing rings 15 into ring gaps 19 between the membrane plates 13. Seals 30, such as O-rings, or flat packings, are situated between the distributor spacing rings 15. It is also possible to lay the distributor spacing rings 15 directly upon one another without seals 30 and produce a metallic tightness.

According to the cross-sectional view of FIG. 2b, which is angularly offset with respect to FIG. 2a, the distributor spacing rings 15 may be provided with drain ducts 31 which extend upward (as shown in FIG. 2b) at an angle with respect to certain membrane plates 13. The ducts 31 may connect ring space 33, which exists between two mutually associated membrane disks 13a, 13b of the membrane plates 13, with a drain duct 35 for liquids. The ducts 35 may be constructed vertically in the distributor spacing rings 15. The distributor spacing rings 15 may be sealed off relative to one another by seals 30. The drain ducts 31, 35 may be constructed in a hydraulically separated manner with respect to the feed ducts 29.

In an area of an interior wall of the centrifugal drum 7, a draining system 37 (see FIG. 1) may be arranged for draining a solid but still free-flowing stage, shown at arrows A.

A piston slide valve 39, which is known, permits the carrying-away of solids from the drum 7 through radially outward leading bores 41 or slits in the centrifugal drum 7 (See FIG. 1).

The operation of the centrifuge 1 is generally as follows, using FIGS. 1, 2a and 2b for reference.

Material to be centrifuged Z enters through the feed tube 3 and the distributor 5 and its bores 25 into the duct 27 and through the bores/ducts 29 between the spacing rings 15 into the ring gaps 19 between the membrane plates 13.

From here, the material to be centrifuged flows radially toward the outside, as indicated by the arrow at F. A portion of the material to be centrifuged enters the membrane plates 13 and that portion of the material to be centrifuged is clarified in the membrane plate 13 area, as shown by arrows P. This portion may be all or part of a liquid stage L and is drained through the ducts 31 and 35 and out centrifuge 1 at L (see FIG. 1).

A residual fraction of the material to be centrifuged, solids, emerges radially toward the outside from the membrane plates 13 and passes beyond the plate spacing rings 17 into the centrifuge compartment 9. As a result of the above-mentioned draining system 37, the solids stage, as shown at A, can be carried away as a function of the product being centrifuged. As a result of the flow direction of the centrifuged and charged material between the membrane plates 13 toward the outside, the flow direction of the solids deposited on the membrane plates 13, where transport takes place toward the outside because of the centrifugal effect, is identical, as shown by arrow F.

When the piston slide valve 39 is opened, the solids are guided from a solids collection space towards the outside of the compartment 9. In this case, a strong flow also occurs from the ring spaces 33 of the membrane plates 13 toward the outside, whereby solids deposited on the membrane plates 13 are removed and are also guided to the outside through the bores 41 and exit at evacuation stage E.

The flow conditions of the present invention are illustrated by arrows P as well as A (carrying away of solids stage), F (flow direction), E (evacuation stage), L (liquid stage) and Z (feed).

The present invention also includes a method of cleaning the centrifuge 1 having sieve system 11. The method includes the steps of opening a piston slide valve 39, thereby allowing a return flow of liquid through the sieve system 11, and removing one or more of substances deposited on or adhering to the sieve system 11 and impurities from the sieve system 11.

Although the present invention has been described and illustrated in detail, it is to be clearly understood that this is done by way of illustration and example only and is not to be taken by way of limitation. The spirit and scope of the present invention are to be limited only by the terms of the appended claims.

LIST OF REFERENCE NUMBERS

Separator 1
feed tube 3
distributor 5
centrifugal drum 7
centrifuge compartment 9
sieve system 11
membrane plate 13
spacing ring 15
spacing ring 17
ring gaps 19
supporting rings 21
wall 23
bores 25
duct 27
bores/ducts 29
seals 30
drain ducts 31
ring space 33
drain duct 35
draining system 37
piston slide valve 39
bores 41
arrow (feed) Z
arrow (draining solids stage) A
arrow (flow direction) F
arrow (evacuation stage) E
arrow P

We claim:

1. A centrifuge, comprising:
    a distributor for introducing material to be centrifuged;
    a sieve system in a centrifugal compartment of a centrifugal drum, the sieve system having a plurality of axially mutually offset membrane plates, the membrane plates being arranged radially with respect to the distributor and having at least two axially-spaced membrane disks with the disks connected with each other by at least one plate spacing ring in an area of the disks' outer circumference;
    the sieve system having a gap between adjacent membrane plates the gap having an inlet at an inner periphery and an outlet at an outer periphery and arranged such that a flow direction of the material to be centrifuged emerging from the distributor onto the membrane plates and exiting the gap into the centrifugal compartment and a flow direction of particles to be deposited on the membrane plates are identical; and
    a piston slide valve for closing the centrifugal drum.

2. The centrifuge according to claim 1, wherein the membrane plates are made of a ceramic material.

3. The centrifuge according to claim 1, wherein the membrane disks are connected with one another in an area of their inside diameter by at least one distributor spacing ring.

4. The centrifuge according to claim 3, wherein the at least one distributor spacing ring has bores for draining clarified liquid.

5. The centrifuge according to claim 3, wherein the at least one spacing ring has ducts for feeding charged material between the membrane plates.

6. The centrifuge according to claim 3, wherein the at least one distributor spacing ring is disposed directly above another spacing ring without any seal.

7. The centrifuge according to claim 3, wherein seals are arranged between the distributor spacing rings.

8. The centrifuge according to claim 7, wherein seals are one of flat packings and O-rings.

9. The centrifuge according to claim 3, wherein the at least one distributor spacing ring is provided with drain ducts which connect a ring space between the membrane disks with a draining system for draining the clarified liquid.

10. The centrifuge according to claim 3, wherein the at least one distributor spacing ring includes drain ducts and feed ducts that are constructed in a hydraulically separate manner with respect to each other.

11. The centrifuge according to claim 1, wherein the distributor has bores in its wall, which bores lead one of directly and by feed ducts into the gap between the adjacent membrane plates.

12. The centrifuge according to claim 1, wherein a solids-enriched stage can be discontinuously drained from the centrifuge compartment by openings in the piston slide valve by opening the piston slide valve and can be continuously drained by a drainage system in an area of the centrifuge compartment.

13. The centrifuge according to claim 12, wherein the openings in the piston slide valve have a nozzle-type design.

14. The centrifuge according to claim 1, wherein the membrane plates are constructed individually and inserted into the centrifugal drum.

15. The centrifuge according to claim 1, wherein the membrane plates are constructed as several plates of a pre-assembled unit and inserted into the centrifugal drum.

16. The centrifuge according to claim 1, further including a feed tube.

17. The centrifuge of claim 1, wherein the distributor is also a feed tube.

18. A method for cleaning the centrifuge of claim 1, the steps comprising:
    opening a piston slide valve, thereby allowing a return flow of liquid through the sieve system; and
    removing one or more of substances deposited on the sieve system and impurities from the sieve system.

* * * * *

UNITED STATES PATENT AND TRADEMARK OFFICE
CERTIFICATE OF CORRECTION

PATENT NO. : 6,969,343 B2  Page 1 of 1
DATED : November 29, 2005
INVENTOR(S) : Wilfreid Mackel et al.

It is certified that error appears in the above-identified patent and that said Letters Patent is hereby corrected as shown below:

<u>Title page,</u>
Item [22], PCT Filed, should read -- May 10, 2001 --.

Signed and Sealed this

Thirty-first Day of January, 2006

JON W. DUDAS
*Director of the United States Patent and Trademark Office*